United States Patent

[11] 3,547,271

[72] Inventor Miles Lowell Edwards
13191 Sandhurst Place, Santa Ana, Calif. 92705
[21] Appl. No. 734,369
[22] Filed June 4, 1968
[45] Patented Dec. 15, 1970

[54] MEMBRANE FLUID DIFFUSION EXCHANGE DEVICE
14 Claims, 12 Drawing Figs.

[52] U.S. Cl. .................................................. 210/321;
23/258.5, 210/456
[51] Int. Cl. ....................................................... B01d 31/00
[50] Field of Search .......................................... 210/22, 23,
232, 321, 456; 23/258.5

[56] References Cited
UNITED STATES PATENTS
3,396,849 8/1968 Lande et al. ................... 210/321
3,459,310 8/1969 Edwards ....................... 210/321

Primary Examiner—Reuben Friedman
Assistant Examiner—Frank A. Spear, Jr.
Attorney—Lee R. Schermerhorn ABSTRACT: A blood oxygenator is disclosed comprising a stack of grooved plastic plates and membranes. Each plate is enclosed in a single membrane sheet which is folded around one edge of the plate and overlies both faces of the plate whereby the membrane sheet forms substantially an envelope for the plate when the stack is assembled and clamped together. Port and manifold connections are arranged to circulate oxygen through channels inside the envelopes and to circulate blood through channels between the envelopes.

INVENTOR.
MILES LOWELL EDWARDS
BY
Lee R. Schermerhorn
Attorney

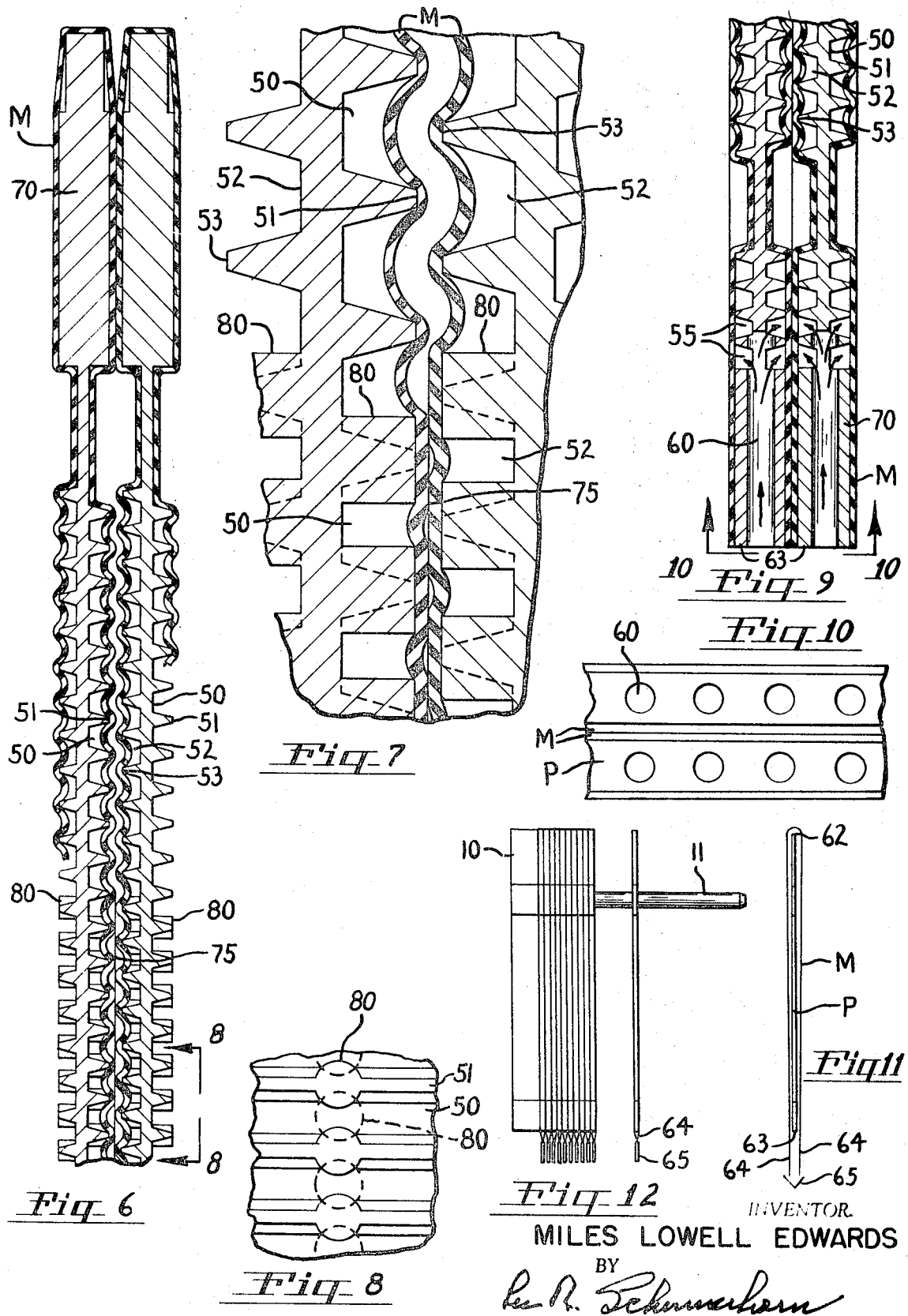

3,547,271

MEMBRANE FLUID DIFFUSION EXCHANGE DEVICE

BACKGROUND OF THE INVENTION

This invention relates to a membrane diffusion exchange device, particularly for the oxygenation or dialysis of blood.

Previous devices for these purposes have been difficult and costly to manufacture. Attempts have been made to simulate the natural lung and kidney. Not only has it been difficult to form the exceedingly small capillary passageways to be disposed on opposite of membranes but it has been most difficult to devise suitable porting and manifolding arrangements for conducting the two fluids into and out of their respective capillary systems without leakage or intermixing. The distribution and collecting ducts are themselves of very small dimensions.

It has heretofore been proposed to form the capillary passageways for the two fluids as parallel grooves in flat plates which are stacked with membranes between the plates. This arrangement, however, encounters the problem of obtaining precise registry between the grooves of adjacent plates in assembling the stack. Such membranes are very thin and limp and difficult to handle. Lamnar flow of the blood has been considered desirable as in the natural lung and kidney.

It is desired to provide an improved form of construction which is less complicated and critical to manufacture.

SUMMARY OF THE INVENTION

The preferred embodiment described herein is a blood oxygenator which performs an artificial lung function wherein the two fluids subject to membrane diffusion are blood and oxygen. As is well understood in the art, the purpose of an oxygenator is to enrich the blood with oxygen and at the same time remove carbon dioxide from the blood.

The present device comprises a stack of plates and membranes which are clamped together between rigid end plates so that there can be no leakage between the clamped surfaces. In order to simplify the stacking process in assembly, each plate is first enclosed in a single membrane sheet twice the size of the plate. The membrane is folded around one edge of the plate and its ends are temporarily secured together at the opposite edge to form an envelope for the plate.

The plates are all identical and have a novel grooving pattern which does not require an extremely high degree of precision in the register of the plates in the stack. The grooves convey oxygen and carbon dioxide only and the blood flows between adjacent membrane surfaces out of contact with the plates. The blood passageways are sinuous to promote a degree of turbulence in the flow of blood whereby these passageways may be considerably large than natural capillary size.

This arrangement greatly simplifies the porting and manifolding of the two fluids, the gas flow being confined within the membrane envelopes and the blood flow being confined within the membrane envelopes and the blood flow being confined to spaces between adjacent envelopes. The paths of the blood flow between the envelopes are established by a novel arrangement of baffles incorporated in the grooving of the plates which press adjacent envelopes together and close the openings therebetween available for the flow of blood in certain areas.

The objects of the invention are, therefore, to provide an improved membrane fluid diffusion exchange device, to provide a device of the type described which is less complicated and expensive to manufacture, to provide a device which requires a relatively small amount of priming fluid, to provide a device in which substantially the entire area of the membranes is utilized for diffusion purposes, to provide a device which comprises a stack of grooved plates and membranes, to provide an arrangement in which the plates are all identical with each plate enclosed in a single membrane envelope, to provide such a stack with passageways for one fluid within each envelope and passageways for the other fluid between adjacent envelopes, to provide blood passageways which produce turbulent flow, to provide a novel arrangement of baffles to control the flow pattern of one fluid, to provide an improved and simplified ducting and manifolding arrangement for the inlet and outlet flows of the two fluids an to provide a disposable diffusion unit which is conveniently removable from a holder having inlet and outlet manifold connections for the two fluids.

The forgoing and other objects and advantages will become apparent and the invention will be better understood with reference to the following description of the preferred embodiment illustrated in the accompanying drawings. Various changes may be made in the details of construction and arrangement of parts and certain features may be used without others. All such modifications within the scope of the appended claims are included in the invention. Although a blood oxygenator is illustrated by way of example, it is understood that the principles of the invention are also applicable to dialysis devices and devices for other purposes involving membrane fluid diffusion exchange between two fluids.

BRIEF DESCRIPTION OF THE DRAWINGS

FIG. 6 is a similarly enlarged view on the line 6–6 in FIG. 3;

FIG. 7 is a view on a still further enlarged scale on the line 7–7 in FIG. 3;

FIG. 8 is an enlarged view on the line 8–8 in FIG. 6;

FIG. 9 is a view on the line 9–9 in FIG. 3 drawn to the same scale as FIGS. 4 and 6;

FIG. 10 is a view on the line 10–10 in FIG. 9;

FIG. 11 is an edge view of a single plate and membrane showing a step in the assembly process; and FIG. 12 is a view showing the building of the stack of plates and membranes.

DESCRIPTION OF THE PREFERRED EMBODIMENT

Figures 1, 2, 3, 4, 5:
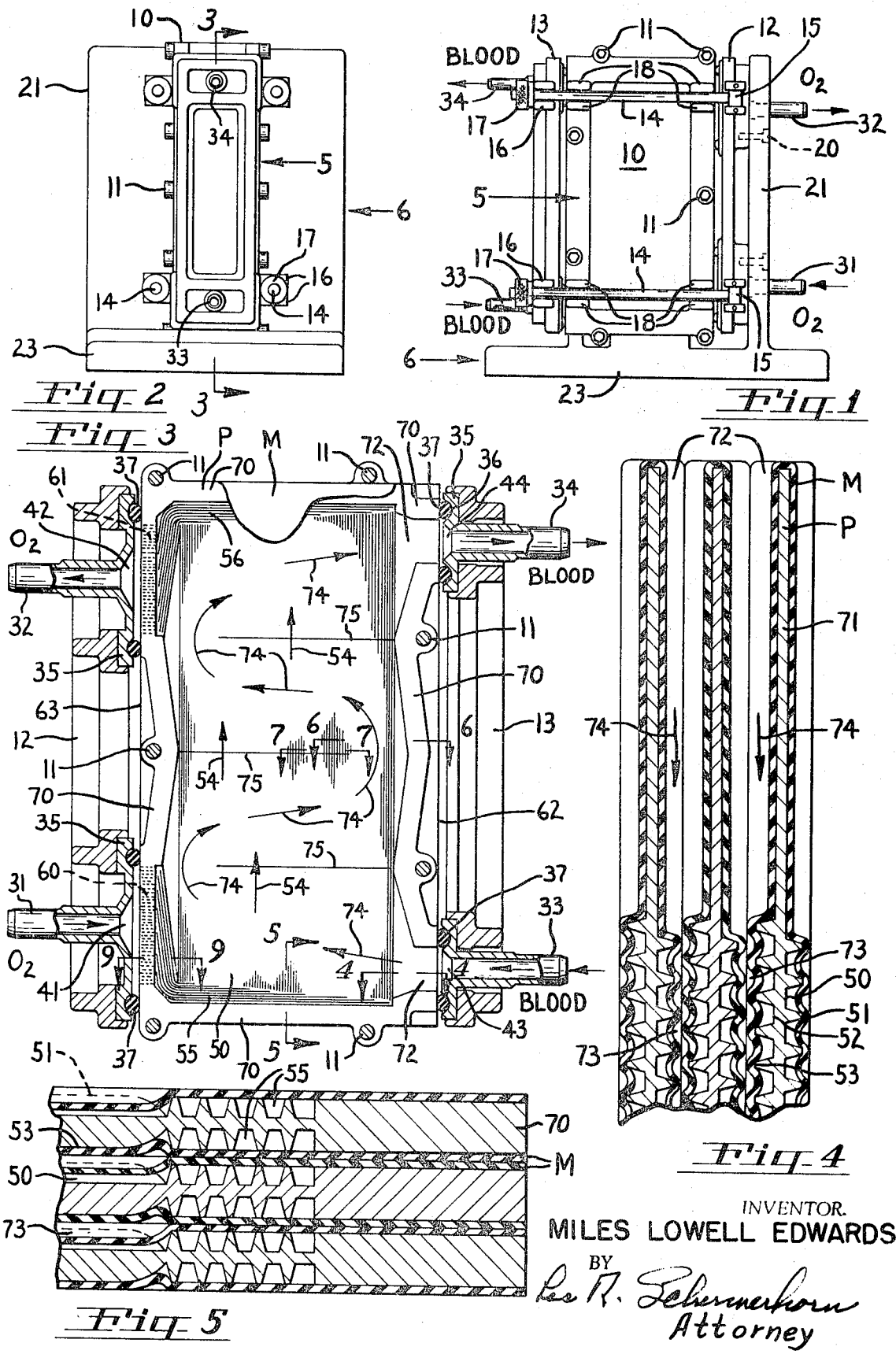
FIG. 1 is a side elevation view of a blood oxygenator embodying the principles of the invention.
FIG. 2 is an end elevation view.
FIG. 3 i an enlarged view on the line 3–3 in FIG. 2.
FIG. 4 is a greatly enlarged view on the line 4–4 in FIG. 3.
FIG. 5 is a similarly enlarged view on the line 5–5 in FIG. 3.

FIGS. 1, 2 and 3 show a stack of plates P and membranes M assembled between a pair of rigid end plates 10. These parts are clamped firmly together by a plurality of bolts 11 which pass through marginal holes in the plates P and end plates 10 as shown. The clamped assemblage forms a disposable diffusion unit 5 which is mounted in a holder 6.

Diffusion unit 5 is clamped edgewise between a rigid vertical metal oxygen manifold plate 12 and a rigid vertical metal blood manifold plate 13 in the holder 6. This clamping relationship is maintained by a pair of swing bolts 14 on opposite sides of the stack. Bolts 14 are pivotally mounted at 15 on plate 12 and each bolt is arranged to swing between a pair of ears at 16 on the plate 13. The bolts have nuts 17 which are tightened against the ears 16. Pairs of ears 18 on the end plates 10 straddle the bolts 14. When nuts 17 are loosened, the bolts may be swung out of the ears 16 and 18, permitting the convenient removal of blood manifold plate 13 and diffusion unit 5 from oxygen manifold plate 12 and holder 6.

Oxygen manifold plate 12 is detachably mounted by screws 20 on an upright member 21 of holder 6. Holder 6 has a horizontal base portion 23 which supports diffusion unit 5. Oxygen manifold plate 12 is equipped with an oxygen inlet connection 31 and an oxygen and carbon dioxide outlet connection 32 which project through openings in the upright member 21. Blood manifold plate 13 is equipped with a blood inlet connection 33 and a blood outlet connection 34. It is preferred to pass the blood through the diffusion unit 5 in an upward direction in order to purge all air from the blood passageways but the direction of oxygen flow is material.

As shown in FIG. 3, each of the four fluid connections 31 to 34 has an internal flange portion 35 provided with a groove 36 in rectangular pattern to receive a resilient rubber seal ring 37.

When nuts 17 are tightened against ears 16, the four seal rings 37 are compressed against flat opposite edge surfaces of the diffusion unit. Each seal ring surrounds an inlet or outlet port opening in an edge of the stack of plates and membranes. Thus, sealing ring 37 on oxygen connection 31 encloses an inlet port space 41 and on oxygen connection 32 the ring encloses an outlet port space 42. Similarly, the sealing ring 37 on blood connection 33 encloses an inlet port space 43 and the ring on connection 34 encloses an outlet port space 44.

As previously stated, the plates P are all identical. The opposite sides of each plate are similar but not identical. A major portion of the area of one side of each plates is covered by vertical grooves 50 and ridges 51 as shown in FIG. 6. The corresponding area of the opposite side has grooves 52 aligned with the ridges 51 and ridges 53 aligned with the grooves 50. Thus, when the plates are assembled in a stack, the ridges 53 confront the grooves 50. The grooves 50 and 52 form the oxygen passageways which carry the oxygen in continuous straight channels from the lower end of the plate to its upper end on both sides of the plate as indicated by arrows 54 in FIG. 3.

Oxygen reaches the lower ends of channels 50 and 52 through a lower series of horizontal grooves 55 which are identical on opposite sides of each plate as shown in FIG. 5. In a similar manner, oxygen leaves the upper ends of grooves 50 and 52 through a series of horizontal grooves 56 similar to the grooves 55. Grooves 55 open into the lower ends of grooves 50 and 52 and grooves 56 open into the upper ends of grooves 50 and 52. Grooves 55 and 56 curve around the corners of the plate to communicate respectively with inlet holes 60 and outlet holes 61 in FIG. 3. Inlet holes 60 form multiple port openings communicating with oxygen inlet port space 41 and outlet holes 61 form multiple port openings communicating with oxygen outlet post space 42.

The construction is similar at both inlet and outlet oxygen ports, the details of the former being shown in FIGS. 9 and 10. The holes 60 are formed in each plate and extend through the plate between its opposite faces to intersect the grooves 55. The inclined position of the grooves brings each groove into communication with one or more of the holes 60 whereby all of the grooves 55 communicate with inlet port space 41 and, similarly, all of the grooves 56 communicate through holes 61 with outlet port space 42.

Thus, the oxygen circuit is rather simple and direct, the oxygen entering through holes 60, passing through grooves 55, then upward through grooves 50 and 52 across the major area of both sides of each plate to its upper end and leaving through grooves 56 and holes 61. This oxygen circuit, of course, requires the membranes M which will now be described.

Each membrane sheet M has a width equal to the vertical dimension of the plates P in FIG. 3 and a length slightly exceeding twice the horizontal dimension of the plates. A membrane is folded around the right edge 62 of each plate in FIG. 3 and across its opposite faces with the ends of the membrane projecting slightly beyond the left edge 63 of the plate. This assembly step is shown in FIG. 11 where the membrane has two end portions 64 projecting beyond the edge 63 of the plate. The membrane is slightly stretched in a direction away from its fold line and a temporary clip 65 is applied to form a stretched envelope around the plate. These units are then assembled in a stack as shown in FIG 12 and clamped together by the bolts 11. Finally, the projecting ends 64 and clips 65 are cut off flush with the edges of the plates as seen in FIG. 9. The preliminary enveloping of each plate in an individual membrane sheet greatly facilitates the stacking step in assembly.

Referring back to FIG. 3, each plate has a peripheral clamping or sealing border area 70 on which pressure is applied by the bolts 11 to seal the plates and membranes together around their edges. The membranes serve as sealing gaskets in border area 70. No part of the plate is thicker than this marginal portion at 70. The oxygen inlet and outlet holes 60 and 61 extend through the clamping area 70.

At the blood inlet and outlet regions within the areas of sealing rings 37, the marginal seal areas 70 of the plates are interrupted, the plates here being of reduced thickness as indicated at 71 in FIG. 4. This provides slotlike blood inlet spaces 72 between the plates communicating with the inlet port space 43 and similar slotlike outlet spaces between the plates communicating with outlet port space 44. Slots 72 are designated as multiple port openings.

The blood is maintained under higher pressure than the oxygen, causing the membranes to hug the thin plate areas at 71 and be deflected into grooves 50 and 52 forming sinuous blood channels 73 creating a mild degree turbulence as the blood flows across the alternate ridges 51 and 53 a shown in FIGS. 4, 6 and 7. This is an undulating sheetlike flow following the path of arrows 74 in FIG. 3.

In width, this entering sheet flow extends from the upper edge of lower seal area 70 up to the lowermost of a plurality of horizontal baffles 75. Lower baffle 75 extends horizontally from the right seal area 70 about three-quarters of the distance across to the left seal area 70, leaving an open passageway for the blood to flow upward around the left end of the baffle. The uppermost baffle 75 is similarly arranged. The intermediate baffle 75 extends from the left seal surface approximately three-quarters of the distance across the plate to the right seal area 70, leaving an open passageway for the blood around the right end of this baffle. Thus, the blood flow is directed in a zigzag path around the ends of the baffles as indicated by arrows 74.

The baffles 75 are formed as shown in FIGS. 7 and 8. Along each line 75 the ridges 51 and 53 are widened to form circular baffle blocks 80. The confronting baffle blocks on adjacent plates overlap each other to some extent substantially closing the blood passageway 73. It is not essential that the blood passageway be completely sealed by the baffle blocks; it is necessary only to block and divert the main portion of the flow. A slight leakage space as appears in FIG. 7 is not objectionable. Baffle blocks 80 do not close the oxygen channels through grooves 50 and 52 whereby the oxygen flows freely past the baffles 75 as indicated by the arrows 54 in FIG. 3.

By making ridges 51 and 53 narrow in relation to their distance apart, the precise registry of ridges 51 and 53 with their confronting grooves 52 and 50 in adjacent plates is not critical. Because of the turbulent flow condition in blood channels 73, the grooves 50 and 52 may be considerably larger than natural capillary size. Both of these considerations allow a reasonable degree of manufacturing tolerance which makes the device easier and less expensive to produce. Also, the narrowness of ridges 51 and 53 makes substantially the whole area of each membrane available for diffusion purposes.

It is recognized that excessive turbulence in the blood is to be avoided. The sinuous channels 73 are intended merely to promote sufficient mixing to eliminate continuous boundary layers adjacent the membranes which tend to impede oxygen and carbon dioxide transfer to and from the central regions of the flow.

The plates an elastic are preferably made of any suitable moldable plastic such as polyethylene. The type of plastic is not critical since the blood does not come into contact with the plates. The membranes M are preferably made of an elastic material such as silicone rubber but other materials capable of stretching or deflecting into the grooves 50 and 52 and which are not injurious to the blood may be used.

The present form of construction allows for variations in the porting arrangements, if desired. Thus, a blood inlet connection may be provided intermediate the lower and upper connections 33 and 34, the connections 33 and 34 then serving as dual outlet connections. When the plates P are large, two inlet and outlet connections may be provided. With such modifications, the positions of baffles 75 may be shifted appropriately.

The oxygen connections may be located at the exposed bottom and top edges of plates P in FIG. 3, if desired, by shifting the positions of port holes 60 and 61 and appropriately modifying the ducting arrangements at 55 and 56 and the holder 6.

When used as a dialysis device, the present blood connections are used for blood and the liquid dialysis solution is passed through the present oxygen connections.

I claim:
1. A membrane fluid diffusion exchange device comprising a stack of plates, a membrane envelope substantially enclosing each plate, first manifold inlet and outlet means communicating with spaces between said envelopes for circulating a first fluid between said envelopes, second manifold inlet and outlet means communicating with said envelopes for circulating a second fluid through said envelopes on opposite faces of said plates in membrane diffusion exchange relation with said first fluid, each envelope comprising a membrane sheet folded around one edge of a plate, said sheet covering said one edge and both faces of the plate and leaving the remaining edges uncovered, said covered edges forming one edge of said stack, said membrane sheets being clamped in said stack against peripheral border areas of said plates to form said envelopes, inlet and outlet means for said envelopes in said uncovered edges of said plates, and quick release means clamping said first manifold inlet and outlet means for said first fluid against said covered edges of said plates and clamping said second manifold inlet and outlet means for said second fluid against said uncovered edges of said plates which contain said inlet and outlet means for said envelopes.

2. A device as defined in claim 1, said plates having thin sections in said peripheral border areas providing slotlike spaces forming multiple port openings between said envelopes on said one edge of the stack communicating with said first manifold means for said first fluid.

3. A device as defined in claim 1, said inlet and outlet means for said envelopes being disposed in the edges of said plates opposite said covered edges, said manifold means for said two fluids being clamped against opposite edges of said stack.

4. A device as defined in claim 1, said inlet and outlet means for said envelopes comprising groups of holes in said uncovered edges of said plates communicating with opposite faces of the plates within said envelopes, said groups of holes also communicating with the respective manifold inlet and outlet means for circulating said second fluid.

5. A device as defined in claim 4, including grooves for said second fluid in said opposite faces of said plates communicating at their opposite ends with said groups of holes.

6. A membrane fluid diffusion exchange device comprising a stack of plates, a membrane envelope substantially enclosing each plate, first manifold inlet and outlet means communicating with spaces between said envelopes for circulating a first fluid between said envelopes, second manifold inlet and outlet means communicating with said envelopes for circulating a second fluid through said envelopes opposite faces of said plates in membrane diffusion exchange relation with said first fluid, each envelope comprising a membrane sheet folded around one edge of a plate, said sheet covering said one edge and both faces of the plate and leaving the remaining edges uncovered, said covered edges forming one edge of said stack, said membrane sheets being clamped in said stack against peripheral border areas of said plates to form said envelopes, inlet and outlet means for said envelopes in said uncovered edges of said plates, said inlet and outlet means for said envelopes comprising groups of holes in said uncovered edges of said plates communicating with opposite faces of the plates within said envelopes, said groups of holes also communicating with the respective manifold inlet and outlet means for circulating said second fluid, grooves for said second fluid in said opposite faces of said plates communicating at their opposite ends with said groups of holes, and baffles directing the flow of said first fluid transversely of said grooves, said grooves in confronting faces of adjacent plates being offset relative to each other to form a sinuous channel for said first fluid between said envelopes.

7. A device as defined in claim 6, said baffles comprising overlapping ridge areas between said grooves in said confronting faces of said plates which substantially close said sinuous channel for said first fluid.

8. A membrane fluid diffusion exchange device comprising a diffusion unit and a holder, said diffusion unit having port openings in two opposite sides of the unit for the inlet and outlet of two fluids, said diffusion unit a stack of plates and membranes and each of said port openings comprising multiple openings in an edge of said stack, said holder having a pair of clamping members on said two opposites sides of said unit, fluid connections in said members in register with said port openings, and quick release clamping means operable on said members for clamping said unit with said port openings in communication with said fluid connections, said unit being removable from said holder when said clamping means are released 9. A device as defined in claim 8, including resilient sealing rings on said fluid connections engageable with said opposite sides said unit about said port openings whereby clamping pressure applied by said clamping means is exerted against said sealing rings.

10. A membrane fluid diffusion exchange device comprising a clamped stack of plates, a membrane envelope substantially enclosing each plate, each envelope comprising a membrane sheet folded around one edge of a plate and overlying opposite faces of the plate leaving the remaining edges of the plate uncovered, a flat peripheral border area on each plate forming a marginal seal between the plate and its envelope and between adjacent envelopes in the stack, said border area having two interruptions at said one edge of the plate, the plates having reduced thickness in said two interruptions to provide a pair of multiple port openings for the inlet and outlet of a first fluid circulating between said envelopes; grooves in said opposite faces of the plates for circulation of a second fluid within said envelopes in membrane diffusion relation with said first fluid, and two groups of holes in said uncovered edges of said plates communicating with said grooves and forming a pair of multiple port openings for the inlet and outlet of said second fluid.

11. A membrane fluid diffusion exchange device comprising a stack of an equal number of relatively flat molded plastic parts and flexible membrane pieces, each plastic part having a smooth and flat surfaced narrow peripheral border portion of a thickness approximately equal to the maximum thickness of the part and the border surfaces having two interruptions, the part having a central area with a thin web central to the opposite surfaces of said border portion, the web supporting a multiplicity of protrusions such as ridges on both sides thereof extending outwardly to planes which approximately correspond to said border surfaces, said border interruptions being spaced apart and on a flat edge of the part, said border at two other flat edge locations having a row of small holes central to and between and parallel to the smooth surfaces of said border portion and extending from the periphery to the central area of the part and connecting with space at both sides of the web; said membrane pieces being approximately twice the area of the plastic parts and in the stack folded tightly around the flat edge of the part covering the border interruptions and of an area such as to fully cover both sides of the part; said stack also comprising two rigid supporting end plates with holding rods therethrough bringing the stack into tight compression; said border interruptions forming manifold rows of inlet and discharge passages into said central areas between adjoining membranes of each pair of adjacent plastic parts, said inlet and discharge passages opening through a flat surface of the stack for connection with manifold for a first fluid; said rows of small holes opening through two other flat exterior areas of the stack for connection with manifold means to conduct a second fluid into and from said central areas of said parts; each fluid thereby having distribution over wide areas of said membranes for membrane diffusion association with each other.

12. A membrane diffusion device embodying a sack of component parts comprising molded parts separated from each other by pairs of elastic membranes, said molded parts embodying on a major surface of each face thereof a system of parallel ridges to form parallel grooves thereon for conducting a first fluid in a consistent direction on the face thereof, wherein a second fluid pressured between the membranes of said pairs forces said membranes to stretch into said grooves to provide a flow path for said second fluid, a baffle comprising matching rows of projections molded in attachment to certain of said ridges arranged to press said pairs of membranes together along the lines of said membranes to direct the flow of said second fluid into a flow pattern which is different from the flow pattern of said first fluid without interfering with the flow patter of said first fluid whereby said two fluids are disposed for substantially uniform diffusion exchange over the areas of said membranes.

13. A membrane fluid diffusion exchange device comprising a clamped stack of plates, a membrane envelope substantially enclosing each plate, each envelope comprising a membrane sheet folded around and covering one edge of a plate and overlying opposite faces of the plate, the enfolded edges of all of said plates being disposed on one side of said stack, a flat peripheral border area on each face of each plate forming a marginal seal between the plate and its envelope and pressing adjacent envelopes against each other to form a marginal seal between adjacent envelopes, said border area having two interruptions at said enfolded edge of the plate, the plates having reduced thickness in said two interruptions to provide a pair of multiple port openings for the inlet and outlet of a first fluid circulating between said envelopes; grooves in said opposite faces of the plates for circulation of a second fluid within said envelopes in membrane diffusion relation with said first fluid, and two groups of openings in uncovered edge portions of said plates communicating with said grooves and forming a pair of multiple port openings for the inlet and outlet of said second fluid.

14. A device as defined in claim 13, including external fluid connections for said two fluids secured against edge portions of said plates in communication with said two pairs of multiple port openings.

PO-1050
(5/69)

UNITED STATES PATENT OFFICE
CERTIFICATE OF CORRECTION

Patent No. 3547271      Dated December 15, 1970

Inventor(s) Miles Lowell Edwards

It is certified that error appears in the above-identified patent and that said Letters Patent are hereby corrected as shown below:

Column 1, line 22, for "Lamnar" read -- Laminar --; line 51, for "large" read -- larger --; lines 55, 56, delete "and the blood flow being confined within the membrane envelopes".

Column 2, line 4, for "an" read -- and --; line 26, for "i" read -- is --; line 72, for "material" read -- immaterial --.

Column 3, line 12, for "plates" read -- plate --.

Column 4, line 58, for "an elastic" read -- P --.

Column 5, line 51, for "envelopes opposite faces" read -- envelope on opposite faces --.

Column 6, line 4, for ", said diffusion unit a stack of plates" read -- , said diffusion unit comprising a stack of plates --; line 16 for "sides said unit" read -- sides of said unit --; line 64, for "wit manifold" read -- with a manifold --; line 71, for "sack" read -- stack --.

Column 7, line 10, for "patter" read -- pattern --.

SIGNED AND
SEALED
MAR 9 1971

(SEAL)
Attest:

Edward M. Fletcher, Jr.
Attesting Officer

WILLIAM E. SCHUYLER, JR.
Commissioner of Patents